US012810450B2

(12) United States Patent
Arbel et al.

(10) Patent No.: US 12,810,450 B2
(45) Date of Patent: Nov. 24, 2026

(54) RECONSTRUCTION 3D HUMAN POSE USING CONSTRAINED OPTIMIZATION

(71) Applicant: Gentex Corporation, Zeeland, MI (US)

(72) Inventors: Lilach Arbel, Jerusalem (IL); Avrech Ben-David, Rosh Ha'ain (IL); Bar Mayo, Rehovot (IL)

(73) Assignee: GENTEX CORPORATION, Zeeland, MI (US)

( * ) Notice: Subject to any disclaimer, the term of this patent is extended or adjusted under 35 U.S.C. 154(b) by 160 days.

(21) Appl. No.: 18/771,145

(22) Filed: Jul. 12, 2024

(65) Prior Publication Data

US 2025/0022152 A1 Jan. 16, 2025

Related U.S. Application Data

(60) Provisional application No. 63/526,777, filed on Jul. 14, 2023.

(51) Int. Cl.

*G06T 7/521* (2017.01)
*G06T 7/62* (2017.01)
*G06T 7/73* (2017.01)

(52) U.S. Cl.

CPC ................ *G06T 7/521* (2017.01); *G06T 7/62* (2017.01); *G06T 7/75* (2017.01);

(Continued)

(58) Field of Classification Search

CPC . G06T 2207/20081; G06T 2207/30196; G06T 2207/20084; G06T 7/70;

(Continued)

(56) References Cited

U.S. PATENT DOCUMENTS

| | | | |
|---|---|---|---|
| 8,532,871 | B2 | 9/2013 | Okada et al. |
| 10,821,897 | B2 | 11/2020 | Kim et al. |

(Continued)

FOREIGN PATENT DOCUMENTS

| | | | |
|---|---|---|---|
| CN | 110544301 | A | 12/2019 |
| CN | 111739161 | A | 10/2020 |

(Continued)

OTHER PUBLICATIONS

Machine translation from Google Patents of JP-7498404-B2 (Year: 2024).*

(Continued)

*Primary Examiner* — Courtney Joan Nelson

(74) *Attorney, Agent, or Firm* — Price Heneveld LLP; Brian James Brewer

(57) ABSTRACT

A monitoring system for a vehicle includes at least one imaging device configured to capture a first image type and a second image type in a sequence. A first illumination source is configured to emit a flood illumination captured by the at least one imaging device in the first image type. A second illumination source is configured to emit a structured light illumination captured by the at least one imaging device in the second image type. At least one processor is configured to extract a 2-dimensional ("2D") joint coordinate representation of a vehicle occupant from the first image type, measure a depth of at least a portion of the 2D joint coordinate representation with the second image type, extrapolate a 3-dimensional ("3D") joint coordinate representation of the vehicle occupant, and estimate, based on the 3D joint coordinate representation, a location of at least one joint that is obscured.

17 Claims, 11 Drawing Sheets

(52) U.S. Cl.
CPC ............... *G06T 2207/10012* (2013.01); *G06T 2207/10028* (2013.01); *G06T 2207/10048* (2013.01); *G06T 2207/30196* (2013.01); *G06T 2207/30268* (2013.01)

(58) Field of Classification Search
CPC ... G06T 7/33; G06T 7/73; G06T 2207/30008; G06T 2207/10028; G06T 7/62; G06T 2207/10012; G06T 7/246; G06T 7/50; G06T 13/40; G06T 7/00; G06T 7/251; G06T 7/55; G06T 2207/20044; G06T 2207/30232; G06T 7/20; G06T 7/521; G06T 7/75; G06T 2207/10048; G06T 2207/30268; G06V 40/23; G06V 40/103; G06V 40/20; G06V 10/806; G06V 40/10; G06V 10/40; G06V 40/25; G06V 10/80; G06V 20/52; G06V 2201/033; G06V 40/11; G06V 20/647; G06N 20/00
See application file for complete search history.

(56) References Cited

U.S. PATENT DOCUMENTS

| | | | | |
|---|---|---|---|---|
| 11,475,589 | B2 | 10/2022 | Tang et al. | |
| 11,935,248 | B2 * | 3/2024 | Gronau ................ | G06V 40/161 |
| 2011/0267344 | A1 | 11/2011 | Germann et al. | |
| 2014/0195096 | A1 | 7/2014 | Schliep et al. | |
| 2019/0102613 | A1 | 4/2019 | Watanabe et al. | |
| 2022/0051437 | A1 * | 2/2022 | Ostadabbas ............... | G06T 7/80 |
| 2022/0242313 | A1 | 8/2022 | Herrmann | |
| 2022/0292705 | A1 * | 9/2022 | Friedman ............... | H04N 13/25 |

FOREIGN PATENT DOCUMENTS

| | | | | |
|---|---|---|---|---|
| CN | 116228587 A | 6/2023 | | |
| DE | 102021211215 A1 | 4/2023 | | |
| EP | 3254172 B1 | 12/2021 | | |
| JP | 7498404 B2 * | 6/2024 | ............... | G06T 7/70 |
| WO | 2011030958 A1 | 3/2011 | | |
| WO | 2022257378 A1 | 12/2022 | | |

OTHER PUBLICATIONS

Yeung, Kwok-Yun; Kwok, Tsz-Ho; Wang, Charlie CL. "Improved Skeleton Tracking By Duplex Kinects: A Practical Approach for Real-Time Applications," Department of Mechanical and Automation Engineering, The Chinese University of Hong Kong, Hong Kong, Journal of Computing and Information Science in Engineering, vol. 13, No. 4, Oct. 16, 2013 10 pages.

Martin, Manuel; Voit, Michael; Stiefelhagen, Rainer "An Evaluation of Different Methods for 3D-Driver-Body-Pose Estimation," 2021 IEEE Intelligent Transportation Systems Conference (ITSC), Indianapolis, USA, Sep. 19-21, 2021, 7 pages.

* cited by examiner

RECONSTRUCTION 3D HUMAN POSE USING CONSTRAINED OPTIMIZATION

CROSS-REFERENCE TO RELATED APPLICATION

This application claims priority to and the benefit under 35 U.S.C. § 119(e) of U.S. Provisional Application No. 63/526,777, filed on Jul. 14, 2023, entitled "RECONSTRUCTION 3D HUMAN POSE USING CONSTRAINED OPTIMIZATION," the disclosure of which is hereby incorporated herein by reference in its entirety.

FIELD OF THE DISCLOSURE

The present disclosure generally relates to a monitoring system, and more particularly to a monitoring system, method, and/or program configured to extrapolate a 3-dimensional ("3D") joint coordinate representation of a vehicle occupant and estimate the location of occluded joints in the joint coordinate representation.

SUMMARY OF THE DISCLOSURE

According to one aspect of the present disclosure, a monitoring system for a vehicle includes at least one imaging device configured to capture a first image type and a second image type in a sequence. A first illumination source is configured to emit a flood illumination captured by the at least one imaging device in the first image type. A second illumination source is configured to emit a structured light illumination captured by the at least one imaging device in the second image type. At least one processor is configured to extract a 2-dimensional ("2D") joint coordinate representation of a vehicle occupant from the first image type, measure a depth of at least a portion of the 2D joint coordinate representation with the second image type, extrapolate at least a partial 3-dimensional ("3D") joint coordinate representation of the vehicle occupant, determine that at least one joint in the 2D joint coordinate representation or the 3D joint coordinate representation is obscured, and estimate, based on the 3D joint coordinate representation, a location of the at least one joint that is obscured.

According to another aspect of the present disclosure, a monitoring system for a vehicle includes at least one imaging device configured to capture a first image type and a second image type in a sequence. At least one processor is configured to extract a 2-dimensional ("2D") joint coordinate representation of a vehicle occupant from the first image type, measure a depth of at least a portion of the 2D joint coordinate representation with the second image type, extrapolate at least a partial 3-dimensional ("3D") joint coordinate representation of the vehicle occupant, determine that at least one joint in the 2D joint coordinate representation or the 3D joint coordinate representation is obscured, and estimate, based on the 3D joint coordinate representation, a location of the at least one joint that is obscured.

According to yet another aspect of the present disclosure, a computer program product includes a non-transitory computer-readable storage medium readable by one or more processing circuits and storing instructions for execution by one or more processors for performing a method of estimating a location of an obscured joint in a driver monitoring system based on feedback from at least one imaging device. The method includes extracting a 2-dimensional ("2D") joint coordinate representation of a vehicle occupant from the first image type, measuring a depth of at least a portion of the 2D joint coordinate representation with the second image type, extrapolating at least a partial 3-dimensional ("3D") joint coordinate representation of the vehicle occupant, determining that at least one joint in the 2D joint coordinate representation or the 3D joint coordinate representation is obscured, and estimating, based on the 3D joint coordinate representation, a location of the at least one joint that is obscured.

These and other features, advantages, and objects of the present disclosure will be further understood and appreciated by those skilled in the art by reference to the following specification, claims, and appended drawings.

DETAILED DESCRIPTION

Figure 1:
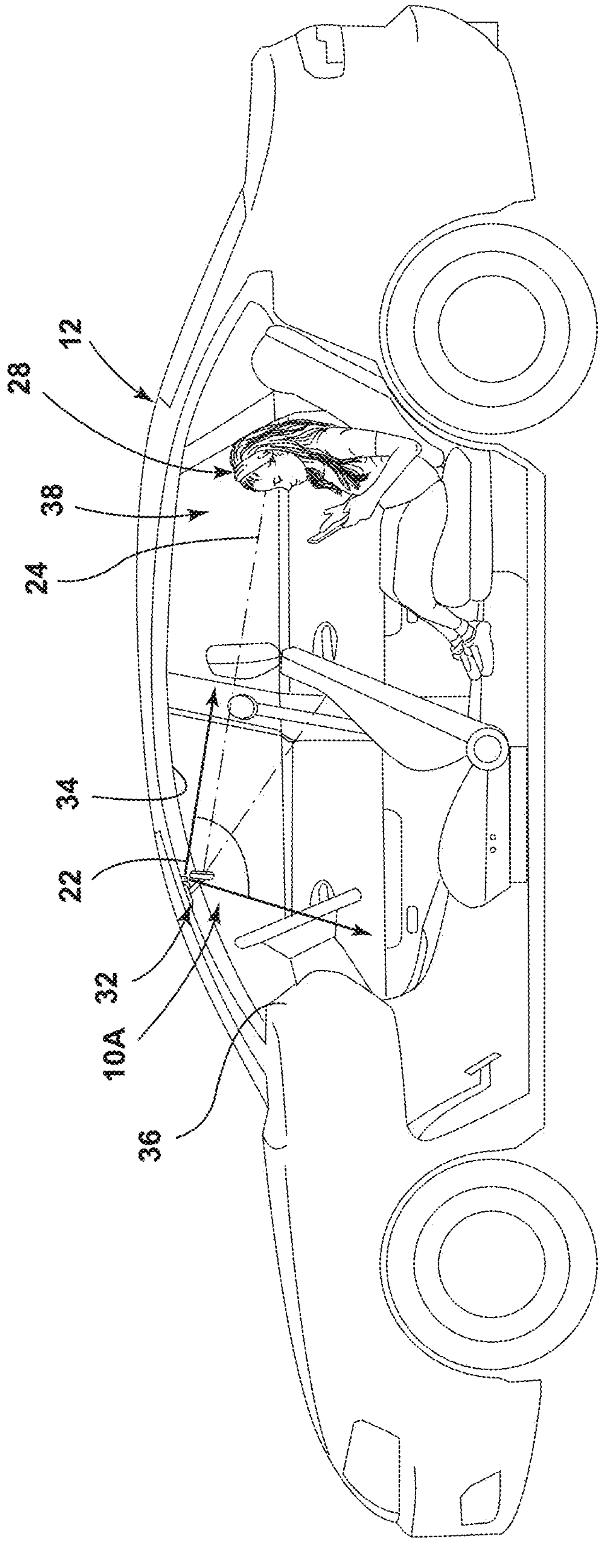
FIG. 1 is a side plan view of a vehicle that incorporates a monitoring system in a first construction in accordance with an aspect of the present disclosure.

The present illustrated embodiments reside primarily in combinations of method steps and apparatus related to a monitoring system configured to extrapolate a 3-dimensional ("3D") joint coordinate representation of a vehicle occupant and estimate the location of occluded joints in the joint coordinate representation. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
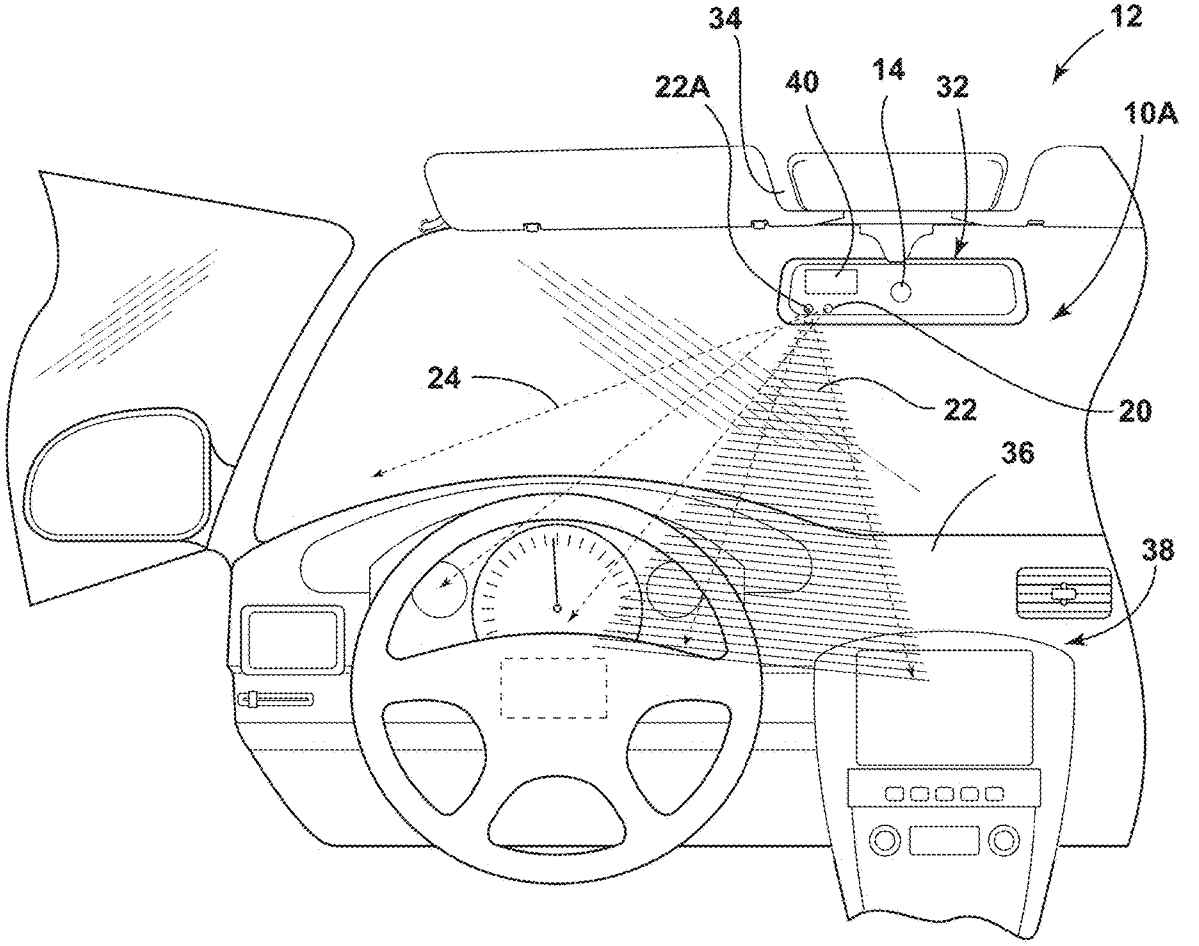
FIG. 2 is an interior view of a vehicle that incorporates a monitoring system in a first construction in accordance with an aspect of the present disclosure.
Figure 3:
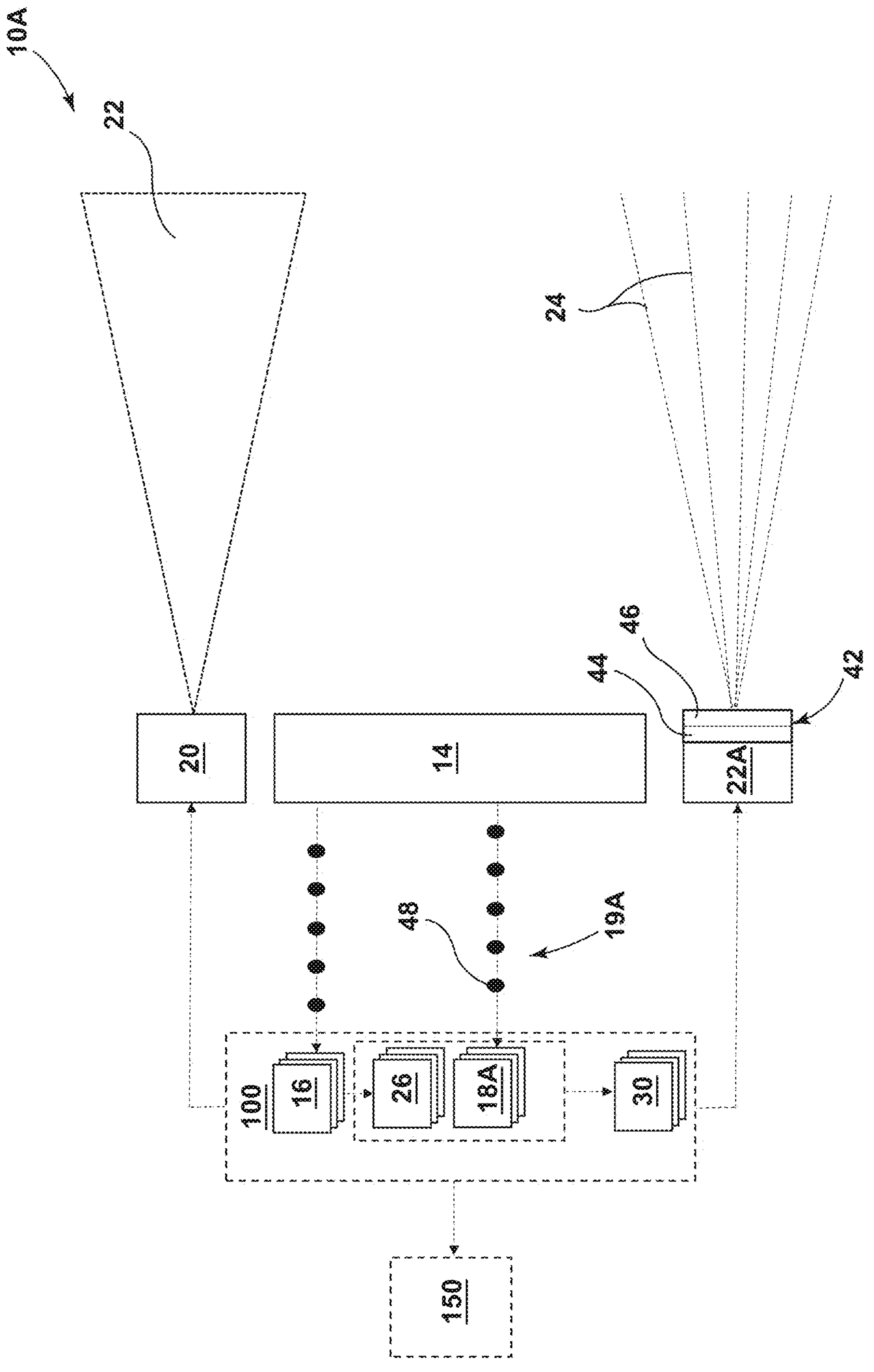
FIG. 3 is a schematic view of a monitoring system including a first construction in accordance with an aspect of the present disclosure.

Referring to FIGS. 1-6 and 9, reference numeral 10A generally designates a monitoring system for a vehicle 12 in accordance with a first construction. The monitoring system 10A includes at least one imaging device 14 (FIG. 2) configured to capture a first image type 16 and a second image type 18A in a sequence 19A (FIG. 3). A first illumination source 20 is configured to emit a flood illumination 22 captured by the at least one imaging device 14 in the first image type 16 (FIG. 3). However, it should be appreciated that the first illumination source 20 may be absent from the monitoring system 10A and the first image type 16 may capture ambient or other environmental light. A second illumination source 22A is configured to emit a structured light illumination 24 captured by the at least one imaging device 14 in the second image type 18A (FIG. 3). A control system 100 includes at least one processor 104 that is configured to extract a 2-dimensional ("2D") joint coordinate representation 26 of a vehicle occupant 28 from the first image type 16, measure a depth of the 2D joint coordinate representation 26 with the second image type 18A, extrapolate at least a partial 3-dimensional ("3D") joint coordinate representation 30 of the vehicle occupant 28, determine that at least one joint 25A-25H in the 2D joint coordinate representation 26 or the 3D joint coordinate representation 30 is obscured, and estimate, based on the 3D joint coordinate representation 30, a location of the at least one joint that is obscured.

With reference now to FIGS. 1-3, the components of the monitoring system 10A may be implemented into a variety of structures within the vehicle 12. For example, the at least one imaging device 14 and the first and second illumination sources 20, 22A may be located within a rearview mirror assembly 32, an overhead console 34, the dashboard 36, and/or other locations within an interior cabin 38 of the vehicle 12. In some embodiments, the rearview mirror assembly 32 may include an electro-optic device (not shown). For example, the electro-optic device may be a single-layer component, a single-phase component, a multi-layer component, and/or a multi-phase component that can be switched between a partially transmissive state and a partially reflective state. In some embodiments, the monitoring system 10A may include a communication module 40, for example, a display within the rearview mirror assembly 32, an audio system within the vehicle 12, and/or the like. The communication module 40 may communicate observations of the monitoring system 10A to the occupant 28 and/or another system within the vehicle 12.

Figure 4:
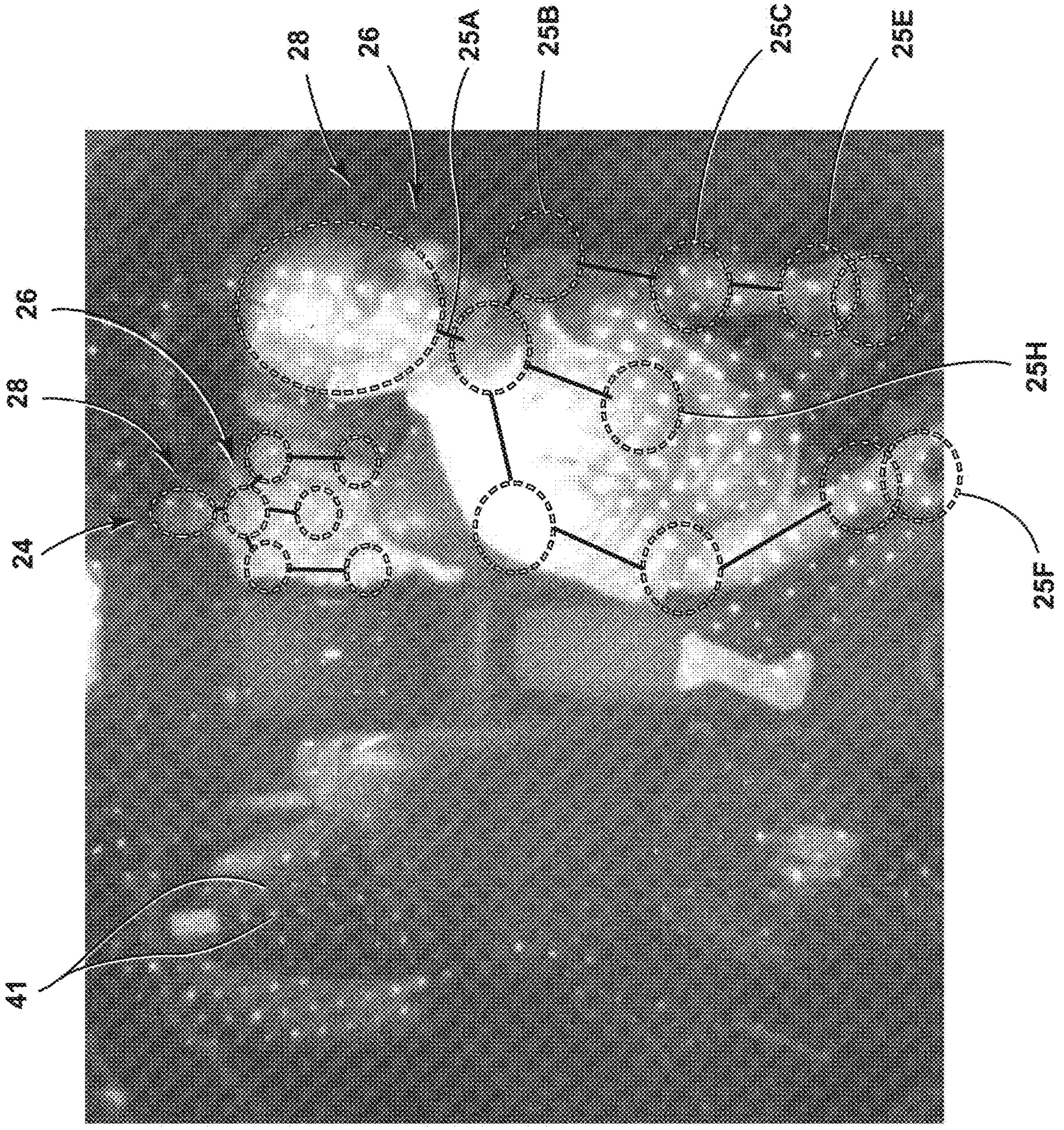
FIG. 4 is a view of a first image type overlaid over a second image type of a vehicle interior cabin that incorporates a monitoring system in accordance with an aspect of the present disclosure.

With reference now to FIGS. 3 and 4, the monitoring system 10A of the first construction may be configured for a first mode of operation under the principles of structured light. In the first mode of operation, the first illumination source 20 is configured to emit the flood illumination 22, for example, substantially within the infrared spectrum. The second illumination source 22A is configured to emit the structured light illumination 24, for example, substantially within the infrared spectrum. In some embodiments, the structured light illumination 24 is distributed as a light spot array with a plurality of light spots 41 (FIG. 4). More particularly, the second illumination source 22A may include a least one laser diode (e.g., a plurality of laser diodes) and an optical lens 42. The optical lens 42 may include a collimation element 44 and a diffractive element 46. The collimation element 44 and the diffractive element 46 may be integrally or separately formed. In some embodiments, the at least one imaging device 14 includes a single imaging device 14 that captures the first image type 16 and the second image type 18A such that the sequence 19A includes capturing the first image type 16 and the second image type 18A within alternating periods of time as designated by reference numeral 48. The periods of time 48 between capturing the first image type 16 and the second image type 18A may be less than a centisecond, less than 75 milliseconds, between 75 milliseconds and 25 milliseconds, about 50 milliseconds, or less than 50 milliseconds. In this manner, the imaging device 14 may capture a plurality of the first image type 16 and the second image type 18A in accordance with the sequence 19A. However, it should be appreciated that the at least one imaging device 14 may include two or more imaging devices 14 and the first image type 16 and the second image type 18A may be captured simultaneously in the sequence 19A. In some embodiments, 2D information about the occupant 28 may be extracted from the second image type 18A.

The control system 100 (e.g., the processor 104) may be configured to process the 2D information about the occupant 28 to detect locations within the second image type 18A that correspond to joints 25A-5H of the occupant 28 to extract the 2D joint coordinate representation 26. For example, the control system 100 (e.g., the processor 104) may utilize deep neural network modeling methods to predict the location of joints 25A-25H in 2D space and classify the joints 25A-25H between visible and obscured (i.e., occluded). In this manner, the process of extrapolating the 3D joint coordinate representation 30 from 2D information and, more particularly, the 2D joint coordinate representation 26 may be entirely on the basis of the second image type 18A. It is contemplated that, the first mode of operation may be completed with only the second image type 18A (e.g., the structured light) such that the first illumination source 20 may be absent or otherwise not utilized for extracting the 2D joint coordinate representation 26 and, consequently, the 3D joint coordinate representation 30. In some embodiments, the first image type 16 may be captured via ambient lighting (e.g., without the first illumination source 20).

Figure 5:
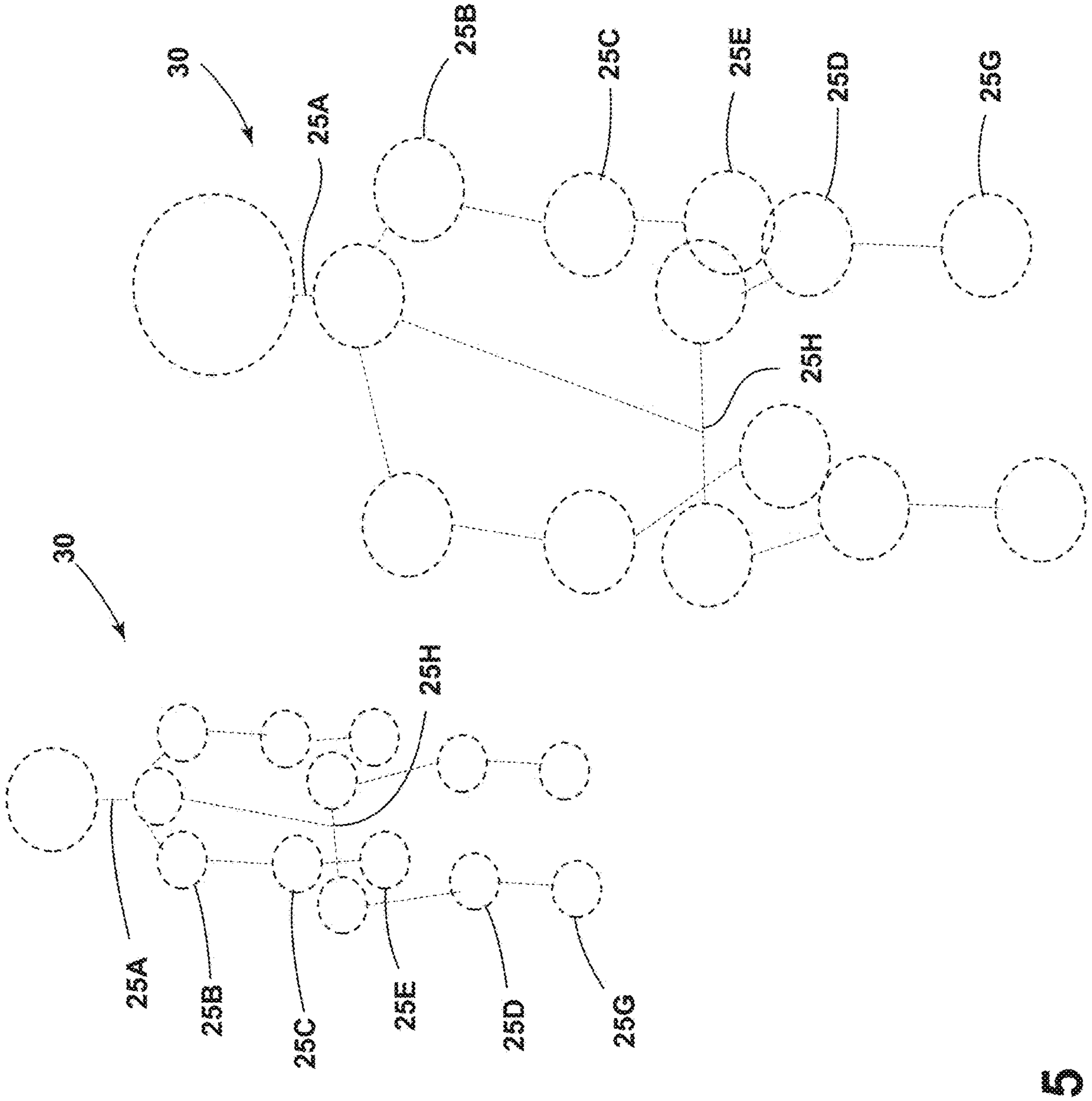
FIG. 5 is a schematic view of two 3-dimensional ("3D") joint coordinate representations of vehicle occupants in accordance with an aspect of the present disclosure.
Figure 6:
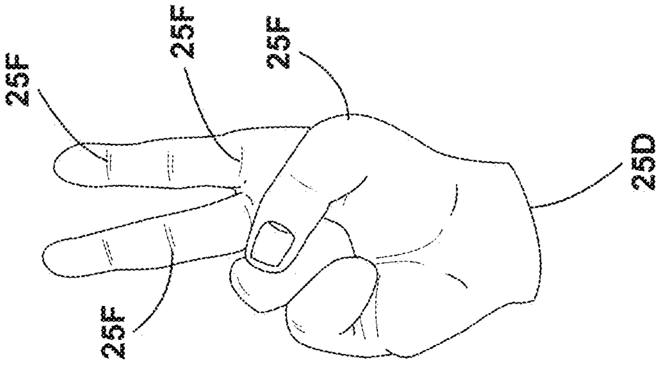
FIG. 6 is a front view of joints in a hand that are identifiable by a monitoring system in accordance with an aspect of the present disclosure.

With reference to FIGS. 4-6, the first image type 16 includes 2D information about the occupant 28. The control system 100 (e.g., the processor 104) may be configured to process the 2D information about the occupant 28 to detect locations within the first image type 16 that correspond to joints 25A-25H of the occupant 28, such as the neck 25A, shoulders 25B, elbows 25C, knees 25D, joints in the hands (e.g., wrists 25E and fingers 25F in FIG. 6), ankles 25G, and hips/torso 25H. The control system 100 (e.g., the processor 104) may be configured to extract the 2D joint coordinate representation in accordance with the locations in the first image type 16 of the joints 25A-25H. The second image type 18A, on the other hand, includes depth information that can be overlaid on the 2D joint coordinate representation 26. More particularly, under the first mode of operation, the control system 100 (e.g., the processor 104) may be configured to measure a depth of the 2D joint coordinate representation 26 with the depth information. The depth information may be obtained based on the principles of triangulation and known geometries between imaging device 14, the second illumination source 22A, and the distribution of the structured light illumination 24 (e.g., the light spot array). For example, the processor 104 may be configured to determine movement based on an outer perimeter or a center of gravity of each light spot 41. Under the first mode of operation, the imaging device 14 and the second illumination source 22A may be closely and rigidly fixed on a common optical bench structure (e.g., within the rearview mirror assembly 32 or other shared location) and, based on the known spacing between the imaging device 14 and the second illumination source 22A (e.g., the laser diodes) and distribution of the structured light illumination 24, the light spot 41 is reflected from the occupant 28 and captured along an epipolar line, which, in turn, can be triangulated to extract a depth of the occupant 28. As depicted best in FIG. 4, the certain joints, namely, the knees 25D and ankles 25G are obscured and therefore, the methods described herein can be utilized to estimate the position of these obscured joints 25D, 25E, which are illustrated in FIG. 5.

With reference now to FIG. 5, the depth of the occupant 28 (e.g., the joints 25A-25H) at each light spot 41 can then be used to extrapolate the 3D joint coordinate representation 30. Likewise, changes in depth of the joints 25A-25H can be used to extrapolate the present posture and movement of the 3D joint coordinate representation 30. It should be appreciated that, in some embodiments, the monitoring system 10A may not include the first illumination source 20 and the flood illumination 22 may be ambient lighting received from an environment. In this manner, in some embodiments, the at least one imaging device 14 may be configured to capture RGB information (e.g., light captured substantially in the visible spectrum) in the first image type 16 and the 2D joint coordinate representation 26 that can be extracted from the RGB information. As depicted in FIG. 6, the monitoring system 10A may be configured to recognize a position of joints in the hands (e.g., wrists 25E and fingers 25F) with the 2D joint coordinate representation 26 and/or with the 3D joint coordinate representation 30.

With reference now to FIGS. 1-6, the 3D joint coordinate representation 30 of the vehicle occupant 28 provides the monitoring system 10A absolute scale information about the vehicle occupant 28. In other words, traditional 2D modeling systems may have complications obtaining absolute scale as a result of forced perspectives from 2D images that cause closer objects to appear larger than reality. In this manner, precise relative positioning of the joints 25A-25H in the 3D joint coordinate representation 30 can be determined to facilitate additional functionalities of the monitoring system 10A. For example, the control system 100 (e.g., the processor 104) may be configured to determine that at least one joint 25A-25H in the 2D joint coordinate representation 26 or the 3D joint coordinate representation 30 is obscured, and estimate, based on the 3D joint coordinate representation 30 and absolute scale, a location of the at least one joint that is obscured. For example, the legs of the occupant 28 in FIG. 4 are obscured.

With continued reference to FIGS. 1-6, utilizing the methods and systems provided herein, the position of the hips/torso 25H can be used to estimate a location of the knees 25D and ankles 25G via one or more of several different parameters. For example, in some embodiments, the control system 100 (e.g., the processor 104) may estimate the location of the at least one joint 25A-25H that is obscured by solving a quadratically constrained quadratic program ("QCQP"). The initial (observed) 3D joints' locations are obtained using the 2D location and the depth using triangulation. The optimized 3D joints' locations are extrapolated (e.g., by the control system 100) solving the QCQP.

The objective function of the QCQP is minimizing the Euclidean distance between an optimized location in a 3D space of at least one visible joint 25A-25H and its observed 3D location, such that skeleton/joint constraints are satisfied and the implied location of the obscured joint 25A-25H falls inside a feasible space constrained by the 2D location of the obscured joint 25A-25H and the other skeleton/joint constraints.

The control system 100 (e.g., the processor 104) may constrain visible joints 25A-25H within a ball around its observed location (e.g., the location calculated from the 2D skeleton and the depth using triangulation), where the ball diameter is determined by the size of the body portion or organ. For example, the hip may have a larger allowed distance compared to the wrist. This constraint is similar to the objective function; however, the control system 100 ensures that each joint is within the defined distance. In the objective function, the control system 100 minimizes the sum of all distances.

In addition, using absolute scale and 3D coordinates obtained from the 3D joint coordinate representation 30, a bone length or a distance between joints 25A-25H can be obtained via the image types 16, 18A and used to estimate the location of the obscured joint 25A-25H by proximate visible joints 25A-25H. In some embodiments, the control system 100 (e.g., the processor 104) may include pre-saved ratio information that relates to common ratios between joint distances. For example, the pre-saved ratio information may include a common ratio of a first distance between shoulders 25B and wrists 25E to determine an average or likely range of a second distance between hips/torso 25H and ankles 25G. In some embodiments, the control system 100 (e.g., the processor 104) may be able to measure the distance between two joints 25A-25H (e.g., shoulders 25B and wrists 25E of a first arm) and apply that measurement to a distance between like joints 25A-25H (e.g., a second arm that is obscured). In cases where the distance cannot be measured, the control system 100 utilizes the known physical lengths of human bones. For example, the bone connecting the elbow and the wrist is, on average, expected to be between 25 to 35 cm.

In some embodiments, the control system 100 (e.g., the processor 104) may be configured to estimate the location of the at least one joint 25A-25H that is obscured by reviewing the first image type 16 or the second image type 18A that was previously obtained in the sequence 19A. For example, if a joint 25A-25H is initially visible in an earlier image 16, 18A, but becomes obscured, the control system 100 (e.g., the processor 104) may estimate a current location of the joint 25A-25H based on the period of time 48 between images 16, 18A and direction of detected motion between two or more images 16, 18A.

In some embodiments, the control system 100 (e.g., the processor 104) may be configured to estimate the location of the at least one joint 25A-25H that is obscured by constraining the estimated location of the at least one joint 25A-25H that is obscured to fall inside the generated 3D cone that bounds a receptive field of a corresponding pixel in the first image type 16. For example, the generated 3D cone may originate in the closest 3D location on the lens 42 that is projected on a corresponding 2D pixel, the cone direction is defined by the angle associated with that 2D pixel, and its spatial angle is determined by the built-in receptive field of a pixel.

In some embodiments, the control system 100 (e.g., the processor 104) may be configured to estimate the location of the at least one joint 25A-25H that is obscured by setting a minimum threshold depth of a depth extracted from a corresponding pixel in the first image type 16. For example, by determining a depth of the object obscuring the joint 25A-25H from corresponding pixels, a minimum depth of the obscured joint 25A-25E can be determined that is equal to or greater than the depth of the thing obscuring the joint 25A-25H. It should be appreciated that the control system 100 (e.g., the processor 104) may be configured to extract depth information related to one of the joints 25A-25H only after it has been determined that the joint 25A-25H is obscured. In this manner, processing resources can be reduced.

Figure 7:
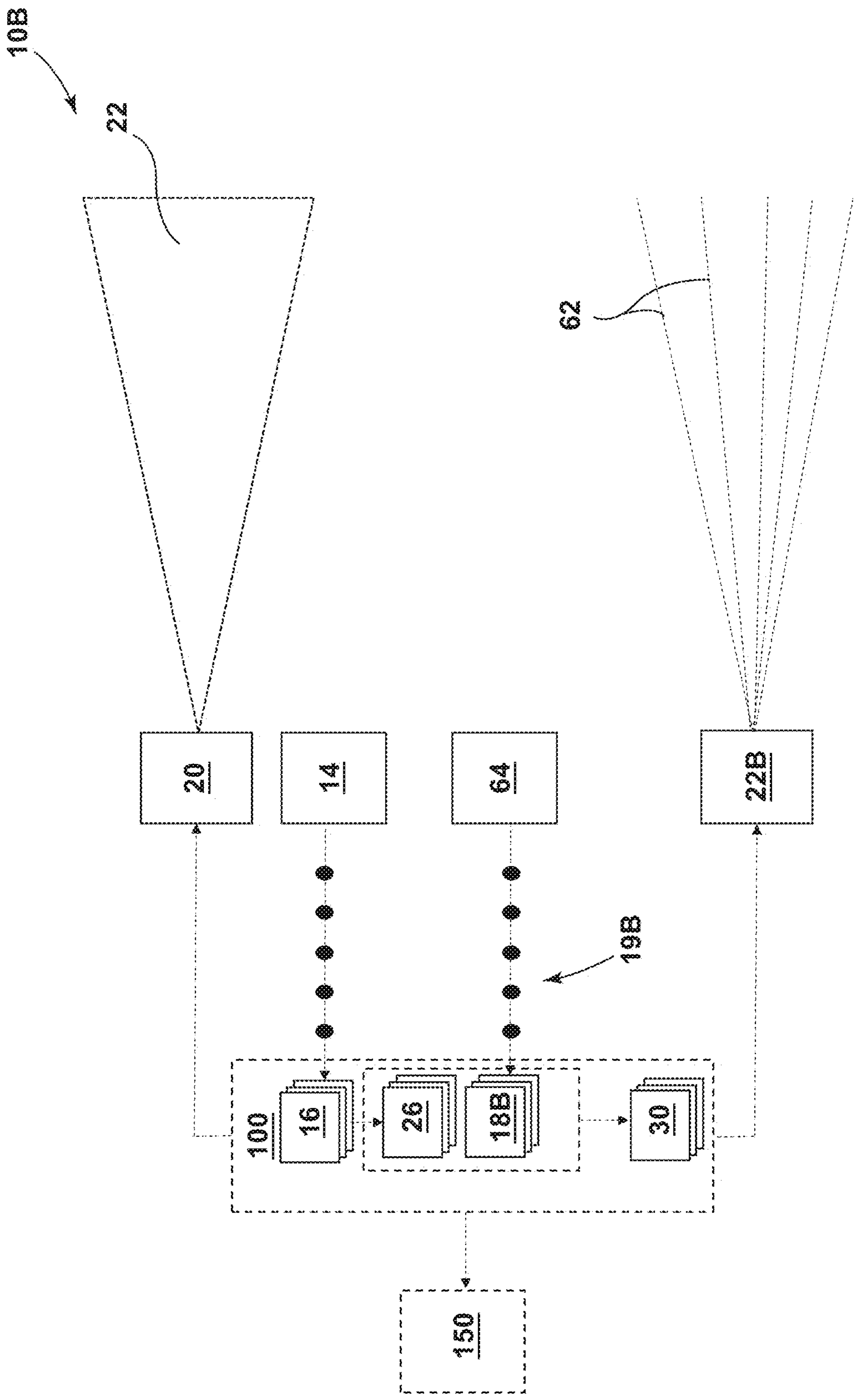
FIG. 7 is a schematic view of a monitoring system including a second construction in accordance with an aspect of the present disclosure.

With reference now to FIG. 7, a monitoring system 10B of a second construction may be configured for a second mode of operation under the principles of Time-of-Flight ("ToF"). Unless otherwise explicitly indicated, the monitoring system 10B may include all the components, functions, materials, and may be implemented in the same structures of the vehicle 12 as the other constructions. However, the monitoring system 10B may include a second illumination source 22B (e.g., at least one laser diode and/or LED) that is configured to emit a beam illumination 62 (in modulated pulses or continuously emitted). The monitoring system 10B includes at least one imaging device that includes a first imaging device 14 and a second imaging device 64 (e.g., a sensor). The first imaging device 14 is configured to capture the flood illumination 22 from the first illumination source 20 in the first image type 16, and the second imaging device 64 is configured to capture the beam illumination 62 in a second image type 18B. The control system 100 (e.g., the processor 104) is configured to extract the 2D joint coordinate representation 26 of the vehicle occupant 28 from the first image type 16, measure a depth of the 2D joint coordinate representation 26 with the second image type 18B, and extrapolate the 3D joint coordinate representation 30 of the vehicle occupant 28. In some embodiments, the monitoring system 10B may further be configured to capture a 2D image of the interior cabin 38 (e.g., the occupant). For example, the first imaging device 14 and/or the second imaging device 64 may be configured to capture the 2D. In this manner, the processor 104 may be configured to extract the 2D joint coordinate representation from the 2D image rather than requiring additional sensors.

With continued reference to FIG. 7, the control system 100 (e.g., the processor 104) may be configured to extract the 2D joint coordinate representation in accordance with the locations in the first image type 16 of the joints 25A-25H. The second image type 18B, on the other hand, includes depth information that can be overlaid on the 2D joint coordinate representation 26. More particularly, under the second mode of operation, the control system 100 (e.g., the processor 104) may be configured to measure a depth of the 2D joint coordinate representation 26 with the depth information. The depth information may be obtained based on the principles of a time difference between the emission of the beam illumination 62 in modulated pulses and the return of the beam illumination 62 back to the second imaging device 64, after being reflected from the vehicle occupant 28 (or other structure within the vehicle). The depth information may also be obtained by measuring the phase shift of the emission of the beam illumination 62 in continuous emission. In this manner, the first imaging device 14 and the second imaging device 64 may capture the first image type 16 and the second image type 18B simultaneously in a sequence 19B. It should be appreciated that in some embodiments, the monitoring system 10B may not include the first illumination source 20 and the flood illumination 22 may be ambient lighting received from an environment.

Figure 8:
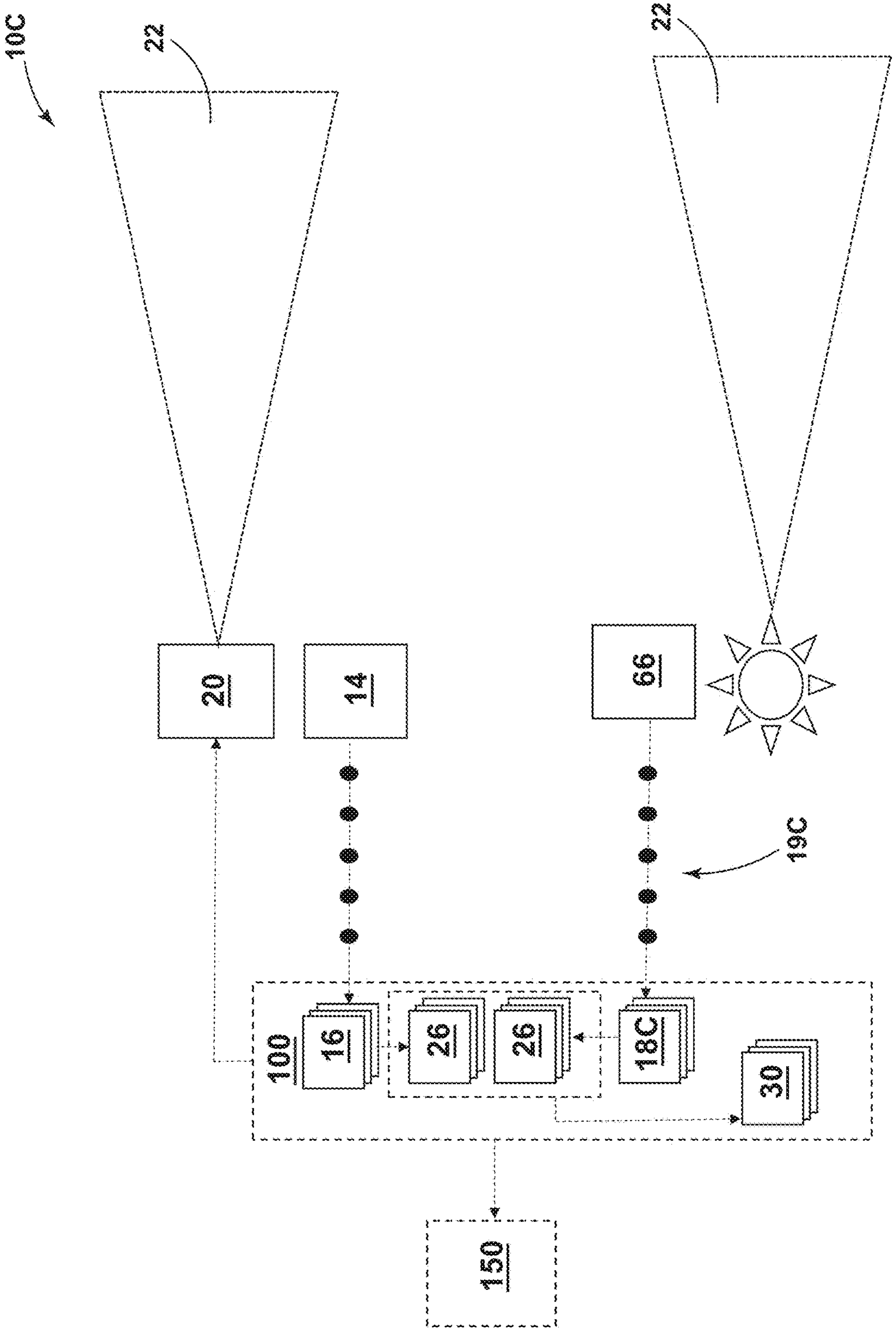
FIG. 8 is a schematic view of a monitoring system including a third construction in accordance with an aspect of the present disclosure.

With reference now to FIG. 8, a monitoring system 10C of a third construction may be configured for a third mode of operation under the principles of stereo vision. Unless otherwise explicitly indicated, the monitoring system 10C may include all the components, functions, materials, and may be implemented in the same structures of the vehicle 12 as the other constructions. However, the monitoring system 10C may include only the first illumination source 20 and the at least one imaging device may include a first imaging device 14 and a second imaging device 66 that are both configured to capture the flood illumination 22. More particularly, the first imaging device 14 is configured to capture the first image type 16 and the second imaging device 66 is configured to capture a second image type 18C that is different from the first image type 16 in orientation. In this manner, the control system 100 (e.g., the processor 104) may be configured to extract first and second orientations of the 2D joint coordinate representation 26 in accordance with the locations in the first image type 16 and the second image type 18C of the joints 25A-25H. More particularly, under the third mode of operation, the control system 100 (e.g., the processor 104) may be configured to obtain depth information of the 2D joint coordinate representation 26 by measuring the position of the 2D joint coordinate representation 26 in the first image type 16 against the position of the 2D joint coordinate representation 26 in the second image type 18C along epipolar lines. The depth information may be obtained based on the principles of triangulation and known geometries between first imaging device 14 and the second imaging device 66 to extrapolate the 3D joint coordinate representation 30. In this manner, the first imaging device 14 and the second imaging device 64 may capture the first image type 16 and the second image type 18C simultaneously in a sequence 19C. It should be appreciated that in some embodiments, the monitoring system 10C may not include the first illumination source 20 and the flood illumination 22 may be ambient lighting received from an environment.

Figure 9:
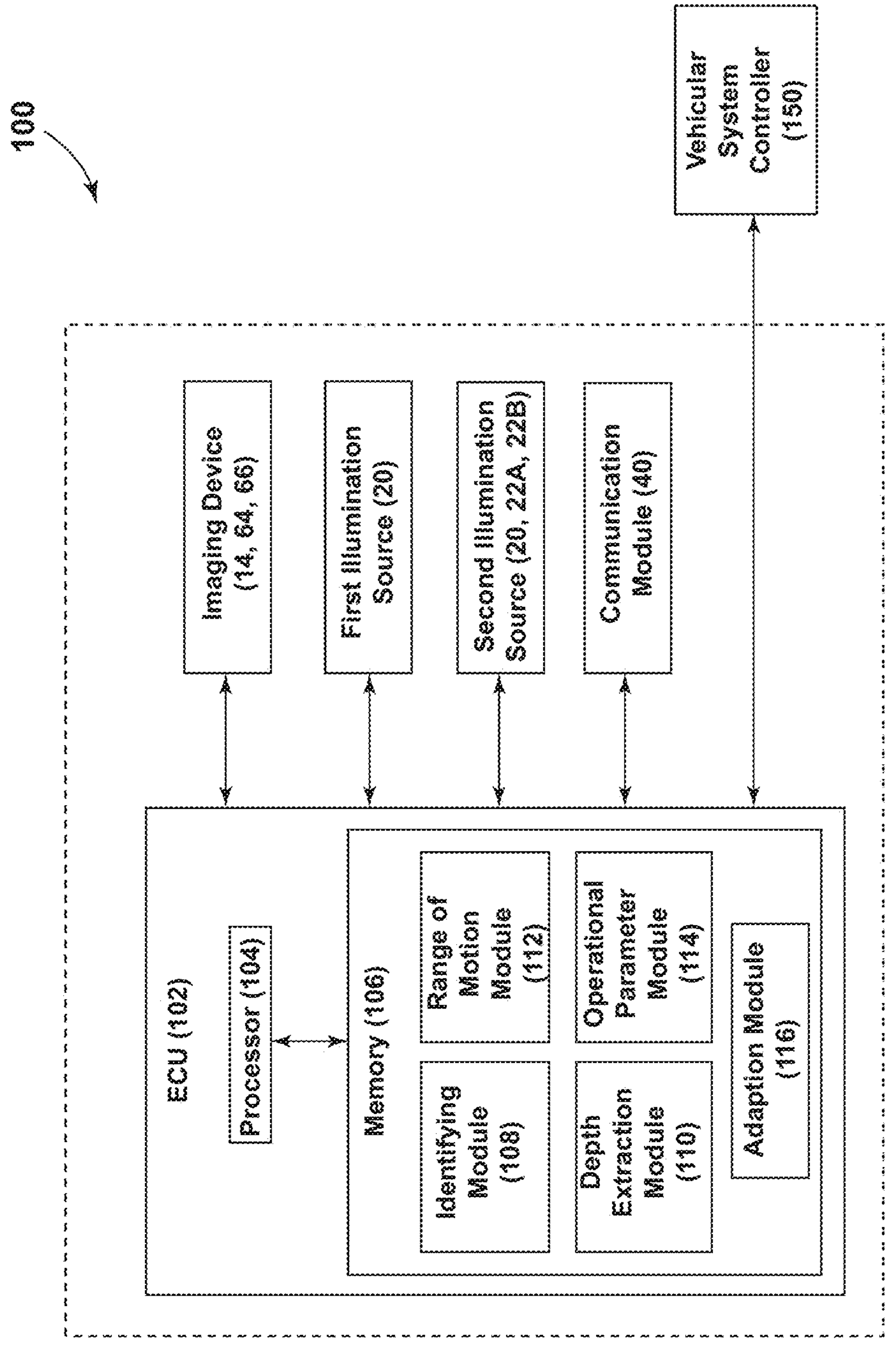
FIG. 9 is a schematic view of a control system that controls functionalities of a monitoring system in accordance with an aspect of the present disclosure.

With reference now to FIG. 9, the control system 100 may be associated with, for example, the monitoring systems 10A-10C. As will be appreciated with further reading, the control system 100 may also be associated with and/or receive instructions from a computer program product 200 that includes instructions to carry out the methods and functionalities described herein. The control system 100 may include at least one electronic control unit (ECU) 102. The at least one ECU 102 may be located in rearview mirror assembly 32 and/or other structures in the vehicle 12. In some embodiments, components of the ECU 102 are located in both the rearview mirror assembly 32 and other structures in the vehicle 12. The at least one ECU 102 may include the processor 104 and a memory 106. The processor 104 may include any suitable processor 104. Additionally, or alternatively, each ECU 102 may include any suitable number of processors, in addition to or other than the processor 104. The memory 106 may comprise a single disk or a plurality of disks (e.g., hard drives) and includes a storage management module that manages one or more partitions within the memory 106. In some embodiments, memory 106 may include flash memory, semiconductor (solid state) memory, or the like. The memory 106 may include Random Access Memory (RAM), a Read-Only Memory (ROM), Electrically Erasable Programmable Read-Only Memory (EEPROM), or a combination thereof. The memory 106 may include at least some instructions received from the computer program product 200. The memory 106 may include instructions that, when executed by the processor 104, cause the processor 104 to, at least, perform the functions associated with the components of the monitoring system 10A-10C. The at least one imaging device (e.g., 14, 64, 66), the first illumination source 20, the second illumination source 22A-22B, and the communication module 40 may, therefore, be controlled by the control system 100. The memory 106 may, therefore, include a series of captured first images 16, a series of second image types 18A-18C, a joint identifying module 108, a depth extraction module 110, a range of motion module 112, and operational parameter module 114. The vehicle 12 may also include one or more vehicular system controllers 150 communicating with the control system 100 for providing various functionalities related to the location of both visible and obscured joints 25A-25H.

With reference now to FIGS. 1-9, the monitoring system 10A-10C includes the at least one imaging device (e.g., 14, 64, 66) configured to capture the first image type 16 and the second image type 18A-18C. The monitoring system 10A-10C includes a control system 100 that extracts a 2D joint coordinate representation 26 from the first image type 16 and/or the second image type (18A-18C). For example, the joint identifying module 108 may include instructions for the processor 104 to detect locations within the first image type 16 and/or the second image type (18A-18C) that correspond to joints 25A-25H of a vehicle occupant 28. Depth information about the 2D joint coordinate representation 26 can be obtained by comparing the first image type 16 and the second image type 18A-18C to extrapolate a 3D joint coordinate representation 30. For example, the depth extraction module 110 may include instructions for the processor 104 to determine the depth information on the basis of the principles of structured light (monitoring system 10A), ToF (monitoring system 10B), stereo vision (monitoring system 10C), or other depth calculating principles. Changes to the 3D joint coordinate representation 30 can be measured to obtain a present posture, joint 25A-25H location, and movement of the 3D joint coordinate representation 30 in absolute scale. The 3D joint coordinate representation 30 may be monitored by instructions from the range of motion module 112 to the processor 104 to estimate a location (or a range of possible locations) of a joint 25A-25H that is obscured. For example, the range of motion module 112 may be used in conjunction with a measured or estimated length between at least two joints 25A-25H to generate a digital cone. The 3D joint coordinate representation 30 may be monitored to ensure contact with a seatback, finger 25F placement on a steering wheel, distinguish between joints 25A-25H of multiple vehicle occupants 28, and other scenarios where estimating the location of an obscured joint 25A-25H may be beneficial. For example, the operational parameter module 114 may include instructions for the processor 104 to generate a notification to the vehicle occupant 28 as a result of improper finger 25F placement (e.g., the communication module 40). In some embodiments, the processor 104 may communicate with the one or more vehicular system controllers 150 to provide various functionalities related to the location of both visible and obscured joints 25A-25H.

With continued reference to FIGS. 1-9 the monitoring system 10A-10C and, more particularly, the control system 100 may be configured to automatically adapt the processes described herein to improve accuracy of the 2D joint coordinate representation 26 and the 3D joint coordinate representation 30. For example, the memory 106 may include an adaption module 116, which may include, for example, machine learning algorithms, deep learning algorithms, neural networks, tracking algorithms, and/or the like. More particularly, the control system 100 (e.g., the processor 104) may be configured to modify parameters over continued usage when extracting the 2D joint coordinate representation 26 and extrapolate the 3D joint coordinate representation of the vehicle occupant 28. In some embodiments, for example, if a particular occupant has an atypical distance between two or more joints 25A-25H, the control system 100 (e.g., the processor 104) may be configured to modify the recognition parameters and save them in the memory 106 (e.g., temporarily, permanently, or until a user input). In this manner, the control system 100 (e.g., the processor 104) may accurately obtain information (e.g., length between joints 25A-25H, missing body portions, joint flexibility, other physical and/or behavioral characteristics of the occupant 28) based on learned behavior from observing one or more occupants 28. Similar methods may be applied to other functionalities of the monitoring system 10A-10C to improve accuracy and redefine parameters.

With still continued reference to FIGS. 1-9, a natural result of formulating QCQP is that the gradient of the Lagrangian of the problem is a linear term and represents physical distance units. As such, tolerances can be adjusted for the optimization by estimating during the method process and by defining acceptable error range. The control system 100 (e.g., the processor 104) may converge the data points, particularly because raw predictions may not be accurate, and as a result there is no intersection between the constraints feasible space, leading to an infeasible problem. In such a case the control system 100 (e.g., the processor 104) may never extrapolate an accurate location of the obscured joint 25A-25H that satisfies all the constraints within a reasonable tolerance for the constraint's violation.

Figure 10:
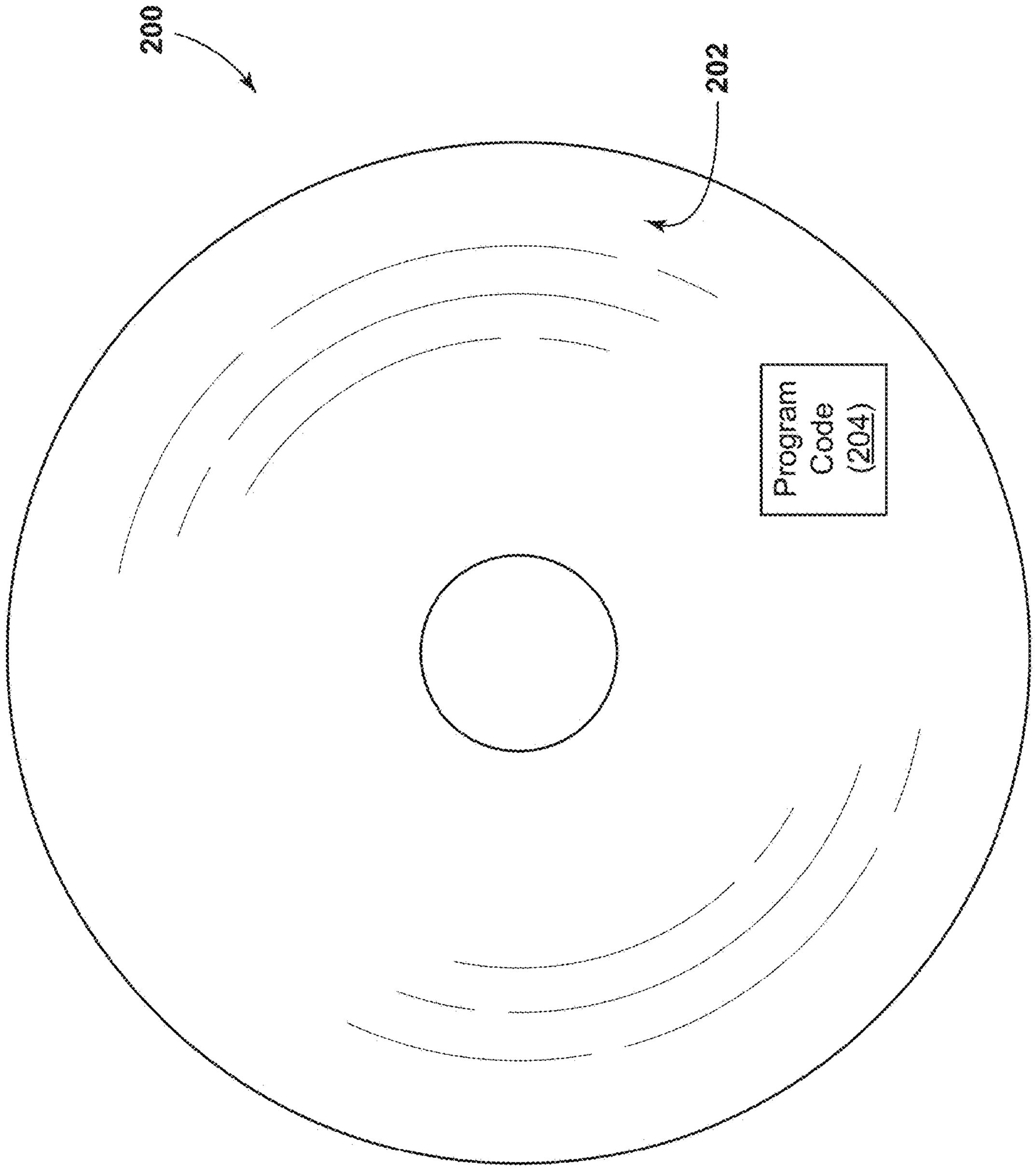
FIG. 10 is a top plan view of a computer program that controls functionalities of a monitoring system in accordance with an aspect of the present disclosure.

With reference now to FIG. 10, in one example, the aforementioned computer program product 200 may include many of the instructions associated with the memory 106. More particularly, the instructions included in the computer program product 200 may include instructions related to estimating, based on the 3D joint coordinate representation, a location of the at least one joint that is obscured. In some embodiments, the computer program product 200 may further include instructions related to measuring depth, creating the 3D joint coordinate representation of the vehicle occupant, and/or the like. For example, the computer program product 200 may include instructions to perform the functions described herein, but may rely on certain features/inputs such as from the monitoring system 10A-10C (e.g., the imaging device 14, 64, 66) and the control system 100 (e.g., the at least one ECU 102). For example, the computer program product 200 may include all or select instructions from the joint identifying module 108, the depth extraction module 110, the range of motion module 112, the operational parameter module 114, and/or the adaption module 116, which may be transferred from the computer program product 200 to the memory 106.

The computer program product 200 may include, for instance, one or more computer-readable medium 202 (e.g., non-transitory memory) to store computer-readable program code means or logic 204 in order to provide and facilitate one or more functions and methods steps described in the present disclosure. The program code contained or stored in/on a computer-readable medium 202 can be obtained and executed by a computer, such as the control system 100 to behave/function in a particular manner. The program code can be transmitted using any appropriate medium, including (but not limited to) wireless, wireline, optical fiber, and/or radio-frequency. The program code 204 includes instructions for carrying out operations to perform, achieve, or facilitate aspects of the disclosure may be written in one or more programming languages. In some embodiments, the programming language(s) include object-oriented and/or procedural programming languages such as C, C++, C #, Java, and/or the like. The program code 204 may execute entirely on the control system 100.

In one example, the program code 204 includes one or more program instructions obtained for execution by one or more processors (e.g., the processor 104). The instructions contained on the program code 204 may be provided to the one or more processors of, for example, the control system 100, such that the program instructions, when executed by the one or more processors, perform, achieve, or facilitate aspects of the functionalities and methods described herein.

Figure 11:
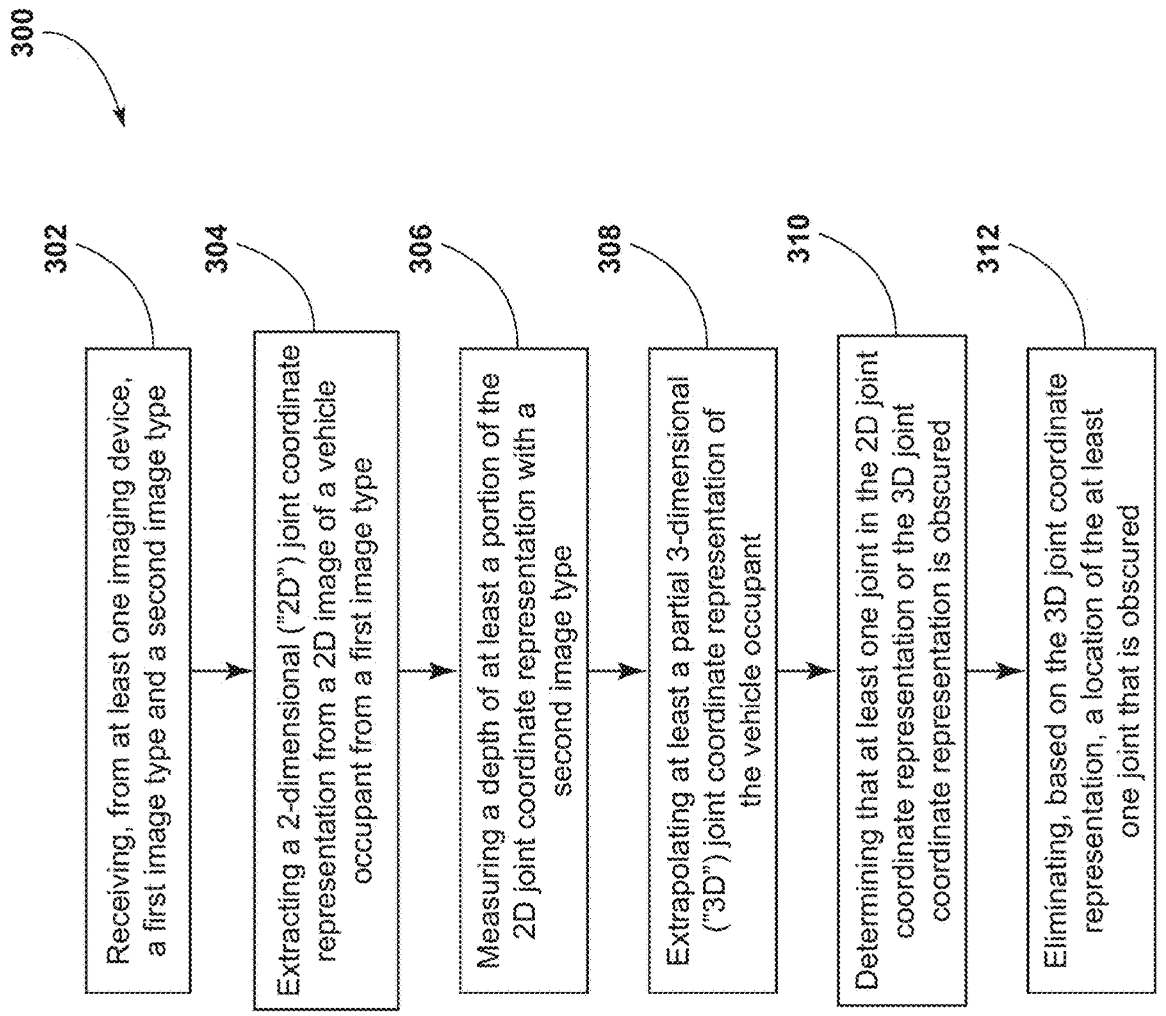
FIG. 11 is a flow chart depicting a method of estimating a location of an obscured joint in a driver monitoring system based on feedback from at least one imaging device in accordance with an aspect of the present disclosure.

FIG. 11 illustrates a method 300 of estimating a location of an obscured joint in a driver monitoring system based on feedback from at least one imaging device is provided. The method 300 may be carried out utilizing the monitoring system 10A, 10B, 10C, the control system 100, and/or a computer program (e.g., the computer program product 200). At step 302, the method 300 includes receiving, from at least one imaging device, a first image type and a second image type. At step 304, the method 300 includes extracting a 2-dimensional ("2D") joint coordinate representation from a 2D image of a vehicle occupant from a first image type. At step 306, the method 300 includes measuring a depth of at least a portion of the 2D joint coordinate representation with a second image type. At step 308, the method includes extrapolating at least a partial 3-dimensional ("3D") joint coordinate representation of the vehicle occupant. At step 310, the method 300 includes determining that at least one joint in the 2D joint coordinate representation or the 3D joint coordinate representation is obscured. At step 312, the method 300 includes estimating, based on the 3D joint coordinate representation, a location of the at least one joint that is obscured.

Step 312 may further include solving a quadratically constrained quadratic program to minimize an Euclidean distance between an optimized location in a 3D joint coordinate representation of at least one visible joint and an observed 3D location of the at least one visible joint. Step 312 may still further include satisfying a skeleton constraint by estimating the location of at least one joint that is obscured within a feasible space constrained by the 2D joint coordinate representation of the at least one joint that is obscured. Step 312 may further include estimating the location of the at least one joint that is obscured by determining a bone length between the at least one joint that is obscured and at least one joint that is visible. Step 312 may still further include estimating the location of the at least one joint that is obscured by constraining visible joints within a ball around its observed location (e.g., the location calculated from the 2D skeleton and the depth using triangulation), where the ball diameter is determined by the size of the body portion or organ. Step 312 may further include estimating the location of the at least one joint that is obscured by reviewing the first image type or the second image type that was previously obtained in the sequence. Step 312 may still further include estimating the location of the at least one joint that is obscured by determining if the at least one joint that is obscured is proximate to a generated 3D cone that bounds a receptive field of a corresponding pixel in the first image type. Step 312 may include estimating the location of the at least one joint that is obscured by setting a minimum threshold depth of a depth extracted from a corresponding pixel in the first image type.

The disclosure herein is further summarized in the following paragraphs and is further characterized by combinations of any and all of the various aspects described therein.

According to one aspect of the present disclosure, a monitoring system for a vehicle includes at least one imaging device configured to capture a first image type and a second image type in a sequence. A first illumination source is configured to emit a flood illumination captured by the at least one imaging device in the first image type. A second illumination source is configured to emit a structured light illumination captured by the at least one imaging device in the second image type. At least one processor is configured to extract a 2-dimensional ("2D") joint coordinate representation of a vehicle occupant from the first image type, measure a depth of at least a portion of the 2D joint coordinate representation with the second image type, extrapolate at least a partial 3-dimensional ("3D") joint coordinate representation of the vehicle occupant, determine that at least one joint in the 2D joint coordinate representation or the 3D joint coordinate representation is obscured, and estimate, based on the 3D joint coordinate representation, a location of the at least one joint that is obscured.

According to another aspect, at least one processor is further configured to estimate the location of the at least one joint that is obscured by solving a quadratically constrained quadratic program to minimize the Euclidean distance between an optimized location in a 3D space of at least one visible joint and its observed 3D location, such that skeleton constraints are satisfied and the implied location of at least one joint that is obscured falls inside a feasible space constrained by the 2D location of the at least one joint that is obscured and the other skeleton constraints.

According to yet another aspect, at least one processor is further configured to estimate the location of the at least one joint that is obscured by determining a bone length between the at least one joint that is obscured and at least one joint that is visible.

According to still yet another aspect, at least one processor is further configured to estimate the location of the at least one joint that is obscured by constraining visible joints within a ball around its observed location (e.g., the location calculated from the 2D skeleton and the depth using triangulation), where the ball diameter is determined by the size of the body portion or organ.

According to another aspect, at least one processor is further configured to estimate the location of the at least one joint that is obscured by reviewing the first image type or the second image type that was previously obtained in the sequence.

According to yet another aspect, at least one processor is further configured to estimate the location of the at least one joint that is obscured by determining if the at least one joint that is obscured is proximate a generated 3D cone that bounds a receptive field of a corresponding pixel in the first image type.

According to still yet another aspect, at least one processor is further configured to estimate the location of the at least one joint that is obscured by setting a minimum threshold depth of a depth extracted from a corresponding pixel in the first image type.

According to another aspect, a flood illumination and a structured light illumination are substantially within an infrared spectrum.

According to yet another aspect, a depth measurement in a second image type is obtained by at least one of a time-of-flight configuration, a stereo vision configuration, or a structured light configuration.

According to another aspect of the present disclosure, a monitoring system for a vehicle includes at least one imaging device configured to capture a first image type and a second image type in a sequence. At least one processor is configured to extract a 2-dimensional ("2D") joint coordinate representation of a vehicle occupant from the first image type, measure a depth of at least a portion of the 2D joint coordinate representation with the second image type, extrapolate at least a partial 3-dimensional ("3D") joint coordinate representation of the vehicle occupant, determine that at least one joint in the 2D joint coordinate representation or the 3D joint coordinate representation is obscured, and estimate, based on the 3D joint coordinate representation, a location of the at least one joint that is obscured.

According to another aspect, at least one processor is configured to solve a quadratically constrained quadratic program to minimize a Euclidean distance between an optimized location in a 3D joint coordinate representation of at least one visible joint and an observed 3D location of the at least one visible joint. The processor is further configured to satisfy a skeleton constraint by estimating the location of at least one joint that is obscured within a feasible space constrained by the 2D joint coordinate representation of the at least one joint that is obscured.

According to yet another aspect, at least one processor is configured to estimate a location of at least one joint that is obscured by constraining visible joints within a ball around its observed location (e.g., the location calculated from the 2D skeleton and the depth using triangulation), where the ball diameter is determined by the size of the body portion or organ.

According to still another aspect, at least one processor is configured to estimate a location of at least one joint that is obscured by determining if the at least one joint that is obscured is proximate a generated 3D cone that bounds the receptive field of a corresponding pixel in the first image type.

According to another aspect, rearview mirror assembly includes a monitoring system for estimating a location of an obscured joint in a driver monitoring system based on feedback from at least one imaging device.

According to yet another aspect of the present disclosure, computer program product includes a non-transitory computer-readable storage medium readable by one or more processing circuit and storing instructions for execution by one or more processor for performing a method of estimating a location of an obscured joint in a driver monitoring system based on feedback from at least one imaging device. The method includes extracting a 2-dimensional ("2D") joint coordinate representation of a vehicle occupant from the first image type, measuring a depth of at least a portion of the 2D joint coordinate representation with the second image type, extrapolating at least a partial 3-dimensional ("3D") joint coordinate representation of the vehicle occupant, determining that at least one joint in the 2D joint coordinate representation or the 3D joint coordinate representation is obscured, and estimating, based on the 3D joint coordinate representation, a location of the at least one joint that is obscured.

According to another aspect, the computer program product includes instructions to estimate a location of at least one joint that is obscured by solving a quadratically constrained quadratic program to minimize a Euclidean distance between an optimized location in a 3D joint coordinate representation of at least one visible joint and an observed 3D location of the at least one visible joint.

According to yet another aspect, the computer program product includes instructions to estimate a location of at least one joint that is obscured by satisfying a skeleton constraint by estimating the location of at least one joint that is obscured within a feasible space constrained by the 2D joint coordinate representation of the at least one joint that is obscured.

According to still another aspect, the computer program product includes instructions to estimate a location of at least one joint that is obscured by constraining visible joints within a ball around its observed location (e.g., the location calculated from the 2D skeleton and the depth using triangulation), where the ball diameter is determined by the size of the body portion or organ.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by “about,” and one not modified by “about.” It will be further understood that the end-points of each of the ranges are significant both in relation to the other end-point, and independently of the other end-point.

The terms “substantial,” “substantially,” and variations thereof as used herein are intended to note that a described feature is equal or approximately equal to a value or description. For example, a “substantially planar” surface is intended to denote a surface that is planar or approximately planar. Moreover, “substantially” is intended to denote that two values are equal or approximately equal. In some embodiments, “substantially” may denote values within about 10% of each other, such as within about 5% of each other, or within about 2% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A monitoring system for a vehicle comprising:

at least one imaging device configured to capture a first image type and a second image type in a sequence;

a first illumination source configured to emit a flood illumination captured by the at least one imaging device in the first image type;

a second illumination source configured to emit a structured light illumination captured by the at least one imaging device in the second image type; and at least one processor configured to:

extract 2-dimensional (“2D”) joint coordinate representation from a 2D image of a vehicle occupant from the first image type;

measure a depth of at least a portion of the 2D joint coordinate representation with the second image type;

extrapolate at least a partial 3-dimensional (“3D”) joint coordinate representation of the vehicle occupant;

determine that at least one joint in the 2D joint coordinate representation or the 3D joint coordinate representation is obscured; and estimate, based on the 3D joint coordinate representation, a location of the at least one joint that is obscured by determining if the at least one joint that is obscured is proximate a generated 3D cone that bounds a receptive field of a corresponding pixel in the first image type.

2. The monitoring system according to claim 1, wherein the at least one processor is further configured to estimate the location of the at least one joint that is obscured by:

solving a quadratically constrained quadratic program to minimize a Euclidean distance between an optimized location in a 3D joint coordinate representation of at least one visible joint and an observed 3D location of the at least one visible joint; and satisfying a skeleton constraint by estimating the location of at least one joint that is obscured within a feasible space constrained by the 2D joint coordinate representation of the at least one joint that is obscured.

3. The monitoring system according to claim 1, wherein the at least one processor is further configured to estimate the location of the at least one joint that is obscured by determining a bone length between the at least one joint that is obscured and at least one joint that is visible.

4. The monitoring system according to claim 1, wherein the at least one processor is further configured to estimate the location of the at least one joint that is obscured by constraining visible joints within a ball around an observed location of the visible joints, wherein the ball diameter is determined by a size of an associated body portion.

5. The monitoring system according to claim 1, wherein the at least one processor is further configured to estimate the location of the at least one joint that is obscured by reviewing the first image type or the second image type that was previously obtained in the sequence.

6. The monitoring system according to claim 1, wherein the at least one processor is further configured to estimate the location of the at least one joint that is obscured by setting a minimum threshold depth of a depth extracted from a corresponding pixel in the first image type.

7. The monitoring system according to claim 1, wherein the flood illumination and the structured light illumination are within an infrared spectrum.

8. The monitoring system according to claim 1, wherein the depth measurement in the second image type is obtained by at least one of a time-of-flight configuration, a stereo vision configuration, or a structured light configuration.

9. A monitoring system for a vehicle comprising:

at least one imaging device configured to capture a first image type and a second image type in a sequence; and at least one processor configured to:

extract 2-dimensional ("2D") joint coordinate representation from a 2D image of a vehicle occupant from the first image type;

measure a depth of at least a portion of the 2D joint coordinate representation with the second image type;

extrapolate at least a partial 3-dimensional ("3D") joint coordinate representation of the vehicle occupant;

determine that at least one joint in the 2D joint coordinate representation or the 3D joint coordinate representation is obscured; and estimate, based on the 3D joint coordinate representation, a location of the at least one joint that is obscured by constraining visible joints within a ball around an observed location of the visible joints, wherein the ball diameter is determined by a size of an associated body portion.

10. The monitoring system according to claim 9, wherein the depth measurement in the second image type is obtained by at least one of a time-of-flight configuration, a stereo vision configuration, or a structured light configuration.

11. The monitoring system according to claim 9, further including a first illumination source configured to emit a flood illumination within an infrared spectrum that is captured by the at least one imaging device in the first image type and a second illumination source configured to emit a structured light illumination within an infrared spectrum that is captured by the at least one imaging device in the second image type.

12. The monitoring system according to claim 9, wherein the at least one processor is further configured to estimate the location of the at least one joint that is obscured by:

solving a quadratically constrained quadratic program to minimize a Euclidean distance between an optimized location in a 3D joint coordinate representation of at least one visible joint and an observed 3D location of the at least one visible joint; and satisfying a skeleton constraint by estimating the location of at least one joint that is obscured within a feasible space constrained by the 2D joint coordinate representation of the at least one joint that is obscured.

13. The monitoring system according to claim 9, wherein the at least one processor is further configured to estimate the location of the at least one joint that is obscured by determining if the at least one joint that is obscured is proximate a generated 3D cone that bounds the receptive field of a corresponding pixel in the first image type.

14. A rearview mirror assembly including the monitoring system of claim 9.

15. A computer program product comprising:

a non-transitory computer-readable storage medium readable by one or more processing circuit and storing instructions for execution by one or more processor for performing a method of estimating a location of an obscured joint in a driver monitoring system based on feedback from at least one imaging device, comprising:

extracting a 2-dimensional ("2D") joint coordinate representation from a 2D image of a vehicle occupant from the first image type;

measuring a depth of at least a portion of the 2D joint coordinate representation with the second image type;

extrapolating at least a partial 3-dimensional ("3D") joint coordinate representation of the vehicle occupant;

determining that at least one joint in the 2D joint coordinate representation or the 3D joint coordinate representation is obscured; and estimating, based on the 3D joint coordinate representation, a location of the at least one joint that is obscured by solving a quadratically constrained quadratic program to minimize a Euclidean distance between an optimized location in a 3D joint coordinate representation of at least one visible joint and an observed 3D location of the at least one visible joint.

16. The product according to claim 15, further including estimating the location of the at least one joint that is obscured by satisfying a skeleton constraint by estimating the location of at least one joint that is obscured within a feasible space constrained by the 2D joint coordinate representation of the at least one joint that is obscured.

17. The product according to claim 15, further including estimating the location of the at least one joint that is obscured by constraining visible joints within a ball around an observed location of the visible joints, wherein the ball diameter is determined by a size of an associated body portion.

* * * * *